Patented Aug. 21, 1934

1,970,669

UNITED STATES PATENT OFFICE 1,970,669

ANTHRAQUINONE DYESTUFF

Paul Nawiasky and Alfred Ehrhardt, Ludwigshafen-on-the-Rhine, Germany, assignors to General Aniline Works, Inc., New York, N. Y., a corporation of Delaware No Drawing. Application January 14, 1932, Serial No. 586,693. In Germany January 22, 1931

7 Claims. (Cl. 260—60)

The present invention relates to new dyestuffs suitable for dyeing cellulose esters and ethers which are alkylated tri- and tetraaminoanthraquinones, and process of producing same.

We have found that dyestuffs suitable for dyeing cellulose esters and ethers are obtained which in part allow of obtaining especially valuable effects by alkylating 1.4.5-tri- or 1.4.5.8-tetraaminoanthraquinone in such a manner that alkyl groups do not enter into all the amino groups, that is to say at least one amino group is alkylated, but at least one amino group remains unaltered. The said partially alkylated tri- and tetraaminoanthraquinones furnish on acetate silk more intensively colored shades than the corresponding completely alkylated aminoanthraquinones and, moreover, the shades obtained therewith do not change or at the most only slightly when exposed to artificial light as do the corresponding unalkylated aminoanthraquinones. The alkylation may be carried out by known methods whereby care should be taken that the alkylation is restricted in the desired degree by shortening the duration of the reaction or lessening the amount of alkylating agent employed. The alkylation probably does not proceed wholly uniformly, but generally speaking mixtures are obtained. Alkylation methods which may be employed comprise, for example, treating the initial material with alkylating agents, such as the alkyl ester of sulphonic acids of benzene and its homologues and dimethylsulphate, in an organic solvent, for example trichlorobenzene and nitrobenzene, or with methyl alcohol in strong sulphuric acid.

The following examples will further illustrate the nature of this invention but the invention is not restricted to these examples. The parts are by weight.

Example 1

1 part of 1.4.5.8-tetraaminoanthraquinone is dissolved in 4 parts of 96 per cent sulphuric acid, 1.5 parts of methanol are allowed to drop in and the mixture is then heated to from 135° to 140° C. The mixture is kept at the said temperature for about 1½ hours and then poured into water. The dyestuff is precipitated by making the aqueous solution alkaline and filtered off. The dyestuff dissolves in 20 per cent sulphuric acid to give a red violet solution and dyes acetate silk powerful blue shades. The dyeing is especially favorable in artificial light.

Example 2

10 parts of 1.4.5.8-tetraaminoanthraquinone are dissolved in 150 parts of trichlorobenzene, and 10.5 parts of toluene sulphonic acid ethyl ester and 10.5 parts of sodium carbonate are then added and the whole heated to boiling for about 3 hours. The trichlorobenzene is then distilled off with steam. The product has similar properties to those of the product described in the foregoing example.

Example 3

10 parts of 1.4.5-triaminoanthraquinone are dissolved in 40 parts of 96 per cent sulphuric acid. 15 parts of methanol are then allowed to flow in, and the whole is heated to between 135° and 140° C. and kept thereat for about 4 hours. The reaction mixture is then worked up as described in Example 1. The product dissolves in 20 per cent sulphuric acid to give a red violet solution and dyes acetate silk strong blue shades.

A similar product is obtained by treating the said initial material with diethylsulphate in trichlorobenzene.

What we claim is:—

1. 1.4.5-triaminoanthraquinones in which at least one amino group is unsubstituted and at least one amino group is substituted by a methyl group, the said aminoanthraquinones dissolving in 20 per cent sulphuric acid to give red violet solutions and dyeing acetate silk strong blue shades.

2. The process of producing dyestuffs suitable for dyeing acetate silk which comprises treating a polyamino anthraquinone corresponding to the formula

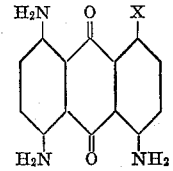

wherein X stands for hydrogen or a NH2- group, with an alkylating agent, care being taken that at least one NH2- group remains unaltered.

3. The process of producing dyestuffs suitable for dyeing acetate silk which comprises treating a polyamino anthraquinone corresponding to the formula

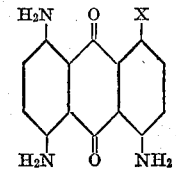

wherein X stands for hydrogen or a NH₂- group with an ethylating agent, care being taken that at least one NH₂- group remains unaltered.

4. The process of producing dyestuffs suitable for dyeing acetate silk which comprises treating a polyamino anthraquinone corresponding to the formula

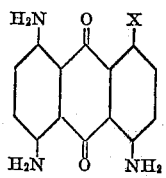

wherein X stands for hydrogen or a NH₂- group, with a methylating agent, care being taken that at least one NH₂- group remains unaltered.

5. The process of producing dyestuffs suitable for dyeing acetate silk which comprises treating a polyamino anthraquinone corresponding to the formula

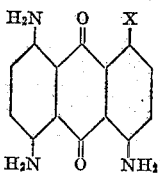

wherein X stands for hydrogen or a NH₂- group, with concentrated sulphuric acid and methyl alcohol, care being taken that at least one NH₂- group remains unaltered.

6. The process of producing dyestuffs suitable for dyeing acetate silk which comprises dissolving a polyamino anthraquinone corresponding to the formula

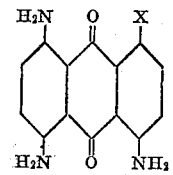

wherein X stands for hydrogen or a NH₂- group, in concentrated sulphuric acid, adding methyl alcohol, heating the mixture to between about 135° and 140° C., care being taken that at least one NH₂- group remains unaltered.

7. 1.4.5-triaminoanthraquinones in which at least one amino group is unsubstituted and at least one amino group is substituted by an alkyl group, the said aminoanthraquinones dissolving in 20 per cent sulphuric acid to give red violet solutions and dyeing acetate silk strong blue shades.

PAUL NAWIASKY.
ALFRED EHRHARDT.